United States Patent [19]
Hausberg et al.

[11] 3,844,745
[45] Oct. 29, 1974

[54] GAS-PURIFICATION SYSTEM FOR STEEL-MAKING PLANT

[75] Inventors: Gerhard Hausberg, Essen-Bredeney; Karl-Rudolf Hegemann, Essen-Bergerhausen, both of Germany

[73] Assignee: Gottfried Bischoff Bau Kompl. Gasreinigungsund Wasserruckkuhlanlagen Kommanditgesellschaft, Essen, Germany

[22] Filed: Aug. 8, 1973

[21] Appl. No.: 386,609

[30] Foreign Application Priority Data
Aug. 10, 1972  Germany........................... 2239373

[52] U.S. Cl.............................. 55/213, 55/94, 55/228, 55/240, 55/257, 98/115, 261/DIG. 54, 261/116, 266/15, 266/31
[51] Int. Cl.............................................. B01d 47/06
[58] Field of Search.................... 55/93–95, 223, 55/213, 240, 228, 467, 257; 261/DIG. 54, 116; 266/15, 31; 98/115

[56] References Cited
UNITED STATES PATENTS

| | | |
|---|---|---|
| 3,063,219 | 11/1962 | Copcutt................................ 266/15 |
| 3,655,361 | 4/1972 | Brown et al. ........................ 266/15 |
| 3,726,065 | 4/1973 | Hausberg et al...................... 55/238 |

FOREIGN PATENTS OR APPLICATIONS

| | | |
|---|---|---|
| 611,571 | 11/1948 | Great Britain........................ 98/115 |

*Primary Examiner*—Bernard Nozick
*Attorney, Agent, or Firm*—Karl F. Ross; Herbert Dubno

[57] ABSTRACT

Ducts serving for the exhaustion of dust-laden waste gases from a converter and from ancillary equipment lead to two scrubbing stations whence the purified gases escape through respective chimneys. The effluent from the main scrubbing station, serving the converter, is cleansed in a settling tank for recirculation to both scrubbing stations; the effluent from the secondary scrubbing station is fed to a preliminary stage of the main station through which it also returns to the settling tank. An annular cowl for the interception of peripherally escaping converter gases is connected to a duct normally communicating with the secondary scrubbing station; during charging of the converter, however, this duct is switched to the main scrubbing station which is then not traversed by converter gases.

10 Claims, 4 Drawing Figures

GAS-PURIFICATION SYSTEM FOR STEEL-MAKING PLANT

FIELD OF THE INVENTION

Our present invention relates to a gas-purification system to be used in a steel-making plant equipped with a converter.

BACKGROUND OF THE INVENTION

In our prior U.S. Pat. No. 3,727,365 we have disclosed an apparatus for scrubbing particle-laden waste gases, such as those of a Bessemer converter, by means of a wash tower in which the gases are irrigated in an upstream compartment whence they flow through a throttle passage into a downstream compartment leading to a water separator.

Such a system, however, does not purify dust-laden gases originating at other locations in a steel-making plant, especially from the operation of ancillary equipment such as mixers and ladles used in preparing and transferring the converter charge. The charging of the tilted converter, whose mouth does not communicate with the inlet of an exhaust duct effective during a blowing operation, also gives rise to dust clouds which contribute to the pollution of the atmosphere if allowed to escape freely through a chimney.

OBJECTS OF THE INVENTION it is, therefore, the general object of our present invention to provide a gs-purification system which goes beyond the teachings of our above-identified prior patent and enables the convenient scrubbing of gases emanating from various locations of a steel-making plant.

A more particular object is to provide means in such a system for efficiently handling both the heavily dust-laden gases evolving during the charging of a converter and the only moderately contaminated air surrounding that converter in the blowing phase.

SUMMARY OF THE INVENTION

These objects are realized, in accordance with our present invention, by the provision of a main scurbbing station and a secondary scrubbing station in which gases to be purified are subjected to irrigation, the main scrubbing station receiving waste gases from an operating converter via a first duct whereas a second duct (or set of ducts) delivers waste gases from ancillary equipment to the secondary scrubbing station. A third duct, with an inlet positioned in the vicinity of the converter mouth, intercepts gases evolving during the charging thereof and directs them to the main scrubbing station which at that time is not utilized for the treatment of the converter gases themselves; this latter duct is selectively connectible, with the aid of one of more valves, to the secondary scrubbing station whereby airborne solids not exhausted by the first duct during a refining operation are extracted by the then not otherwise utilized (or underutilized) facility serving for the treatment of gases emitted by the ancillary equipment.

According to a more specific feature of our invention, the gases traversing the two scrubbing stations are subjected to the action of respective irrigation means including a common source of wash water, such as a settling tank to which the effluents of both stations are led for recirculation of the liquid. Advantageously, this wash water is circulated in tandem through the two scrubbing stations, the effluent of the secondary station with its relatively minor load of contaminants being passed into at least one of several washing stages in the main station. These washing stages, partly supplied with fresh water directly from the source, are advantageously disposed in the first duct within the main station while at least one further washing stage (also supplied with fresh water) is located in the third duct, the two ducts merging within the main station downstream of their respective washing stages at the entrance of a common water separator. Between these washing stages and the separator, each duct may form a constricted annular passage adapted to be partly or completely blocked by an adjustable insert, in the general manner described and shown in our prior patent referred to above. Thus, the insert in the third duct may be used as a valve closing the gas flow therethrough whenever this duct communicates with the secondary scrubbing station during operation of the converter.

BRIEF DESCRIPTION OF THE DRAWING

The above and other features of our invention will now be described in detail with reference to the accompanying drawing in which.

SPECIFIC DESCRIPTION

Figure 1:
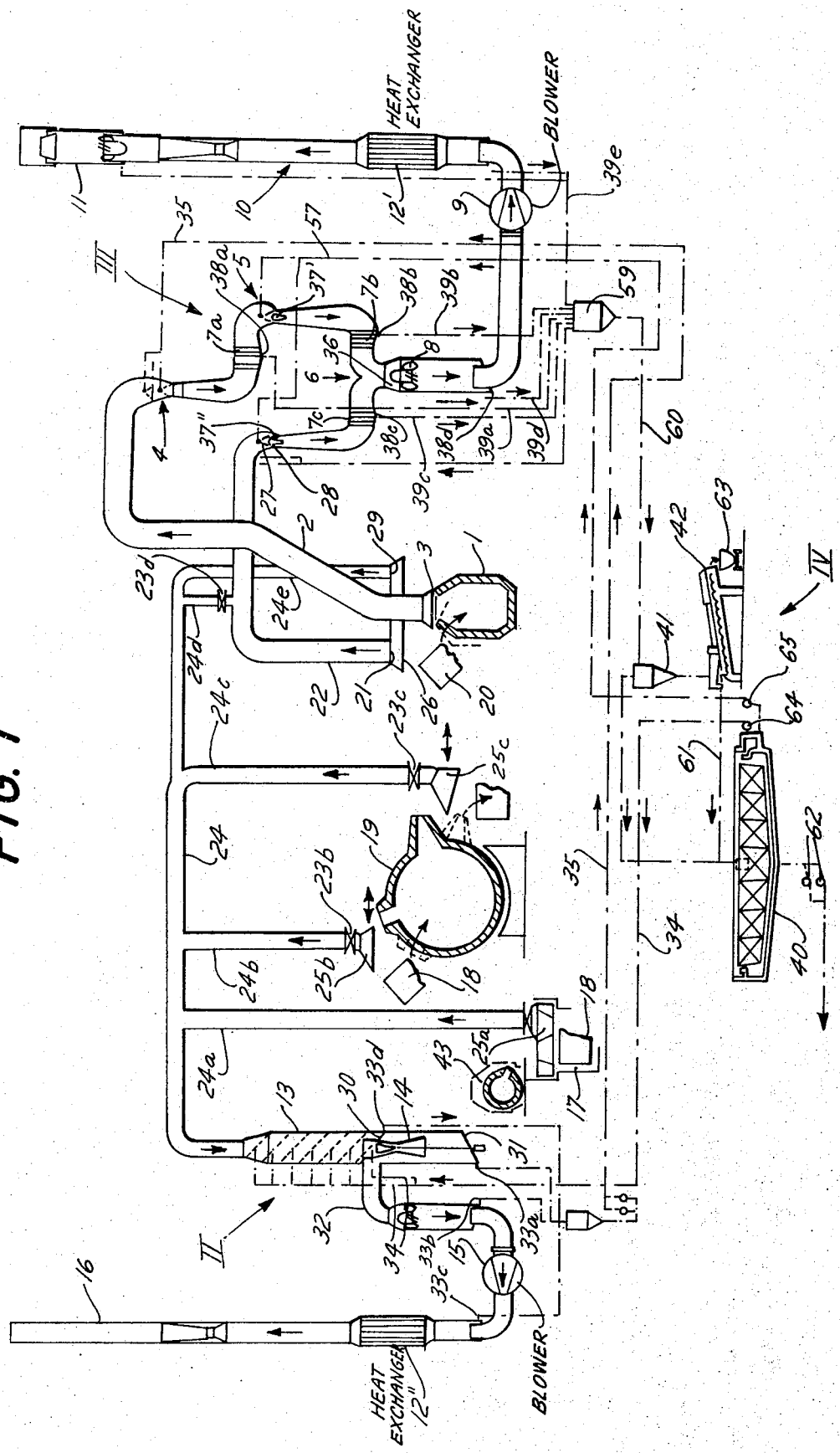
FIG. 1 is a somewhat diagrammatic overall view of a gas-purification system embodying our invention.

The system shown in FIG. 1 comprises a tiltable converter 1 whose off-normal (charging) position has been indicated in dot-dash lines, this converter forming part of a steel-making plant further including such ancillary equipment as a transfer pit 17 and a mixer 19. Molten pig iron, transported in a railroad car 43, is poured into the pit 17 where it is received by a ladle 18 serving to carry it to the mixer 19 for the admixture of additives therewith; the contents of the mixer are then emptied into a charging ladle 20 which dumps them into the converter. These steps occur, as is well known, at different times in the course of an operating cycle of the plant.

The mouth of the normally positioned converter 1 is overlain by a hood 3 opening into a duct 2 which has a vertical pipe section in line with the converter axis; this vertical pipe section is surrounded by a downwardly open annular cowl 26 positioned to intercept gases rising around the duct 2. Cowl 26 opens at 21 into another duct 22 which merges with duct 2 at a junction 6 within a main scrubbing station III. A further duct 24 has branches 24a, 24b, 24c whose entrance ends from hoods 25a, 25b, 25c overlying the pit 17, the loading side of mixer 19 and the unloading side of that mixer, respectively, to collect the rising gases. A further branch 24d is connected to duct 22, branches 24a – 24d being individually closable by slide valves 23a – 23d which are open only when the equipment concerned is in use, e.g., during loading and unloading of the mixer 19 in the case of valves 23b and 23c, respectively. A further branch 24e of duct 24 communicates at 29 with the cowl 26.

Figure 2:
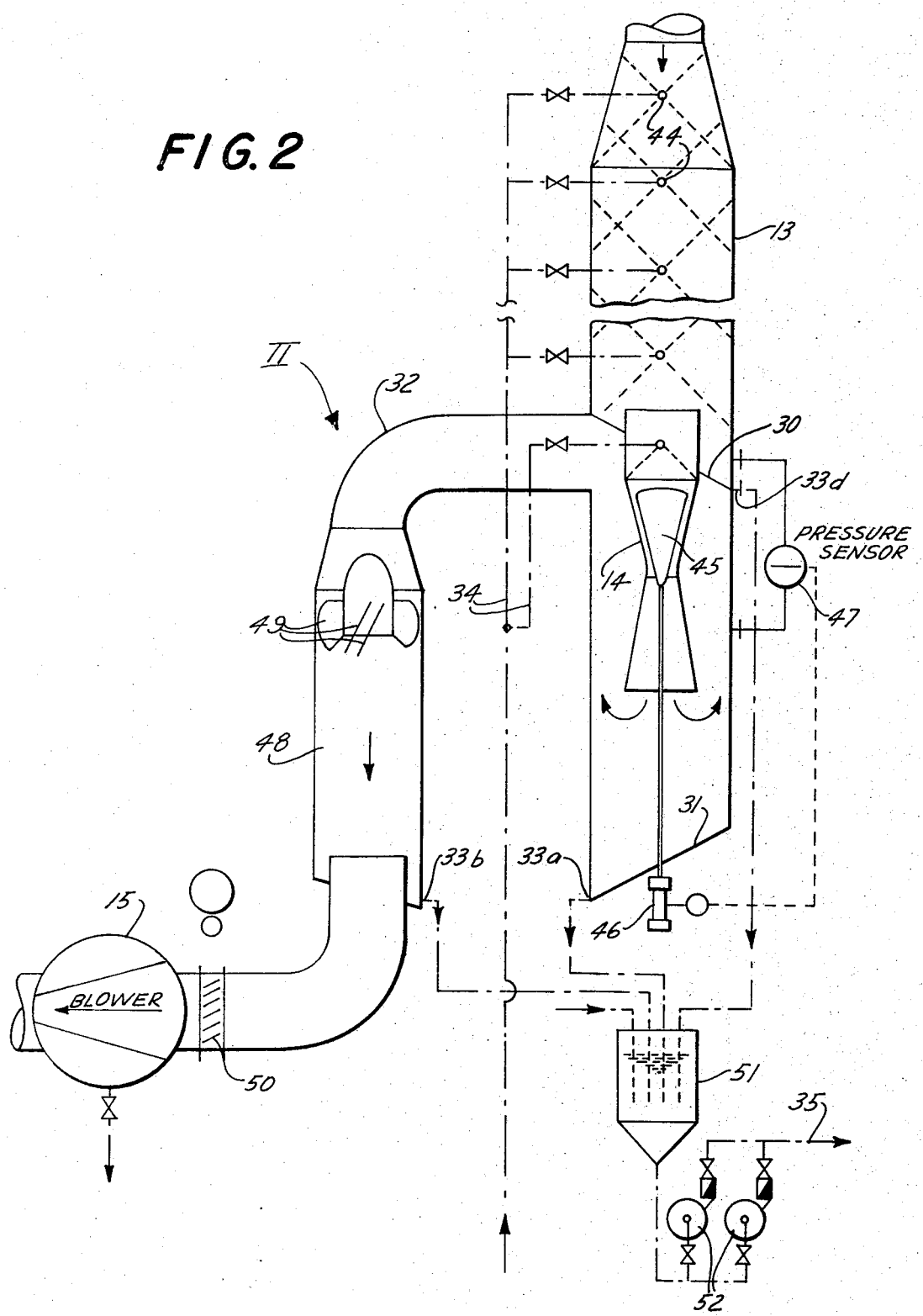
FIGS. 2, 3 and 4 are enlarged detail views of areas respectively marked II, III and IV in FIG. 1.
Figure 3:
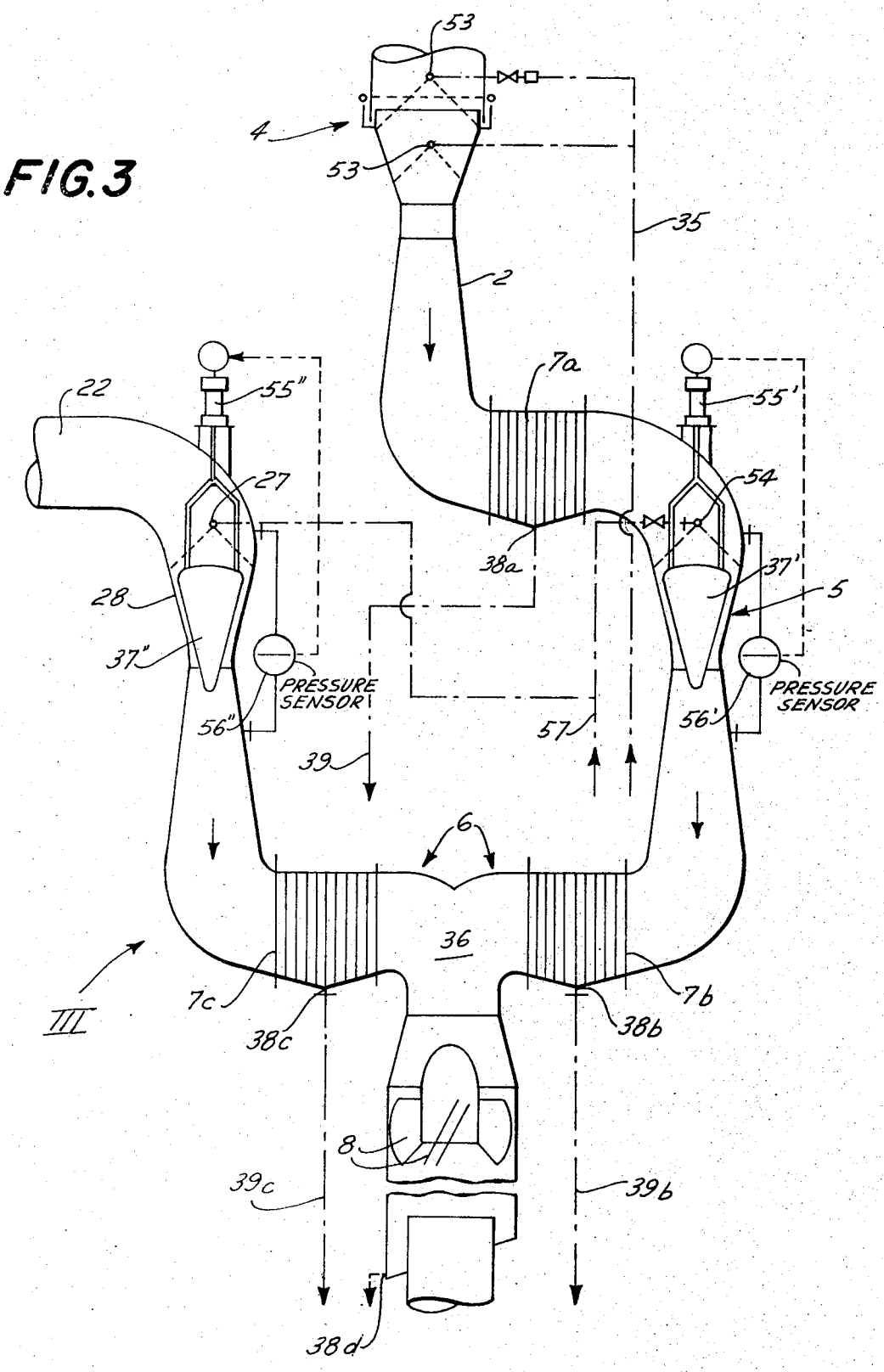

Duct 24 terminates at a secondary scrubbing station II including a blower 15 which draws the gases from its several branches through a wash tower 13 provided with a nozzle 14 downstream of a set of spray heads 44 (see also FIG. 2). An insert 45 in nozzle 14 is vertically shiftable by a mechanism 46, as described in our above-identified prior patent, under the control of a sensor 47 responsive to the pressure differential between an upstream compartment and a downstream compartment separated by an inclined partition 30. The downstream compartment has a sloping bottom 31, provided at its lowest point with a drain 33a, and opens well above the lower end of nozzle 14 into a lateral outlet 32 whereby the wetted gases descending through nozzle 14 are sharply deflected to shed most of their entrained particles before escaping into a vortex chamber 48 provided with vanes 49 in which further separation between liquid and solids takes place. More liquid is drained off at 33b while the purified gas passes through a valve 50 and the blower 15 into a flue 16 which may open into the atmosphere and is shown provided with a heat exchanger 12″ for the recovery of residual thermal energy from the gas. Residual moisture is collected at a drain 33c whereas spent wash water from spray heads 44 runs off at 33d. All the drains 33a – 33d empty into a vessel 51 whose contents are fed by pumps 52 to a conduit 35 leading to a preliminary washing stage 4 in duct 2 (see also FIG. 3). Stage 4 comprises couple of spray heads 53 in cascade with a further spray head 54 just above a nozzle 5 integral with duct 2 and provided with an insert 37′; a similar insert 37″ is disposed in a nozzle 24 formed by a constriction of duct 22. The two pear-shaped inserts 37′ and 37″ are vertically adjustable by mechanisms 55′, 55″ under the control of respective sensors 56′, 56″ responsive to the pressure differentials across their constricted passages; with valve 23d (FIG. 1) open, the suction of blower 15 is communicated to duct 22 to generate a sufficiently low pressure upstream of insert 37″ to actuate the sensor 39 so as to cause a lowering of that insert to block the passage of nozzle 28. Sensor 37′ may also block the passage of nozzle 5 under appropriate circumstances, especially with convertor 1 out of its operating position, hood 3 may be provided with a shutter for closing the entrance to duct 2 at that time.

A spray head 54 in duct 2, just upstream of nozzle 5, and a similar spray head 27 in duct 22, just upstream of nozzle 28, are supplied with fresh wash water from a conduit 57. Ducts 2 and 22 further include baffle-type water separators 7a, 7b, 7c provided with drains 38a, 38b, 38c leading via conduits 39a, 39b, 39c to a collecting vessel 59. A further such conduit 39d extends from a drain 38d at the bottom of a vortex chamber 36 provided with vanes 8, this chamber serving as a water separator common to ducts 2 and 22. The gases freed from solids and from most of the liquid pass from water separator 36 through a blower 9 into a flue 10 provided with a heat exchanger 12′ and with an additional vortex chamber 11; the latter chamber and other parts of the flue 10 are drained into vessel 59 by a conduit 39e.

Figure 4:
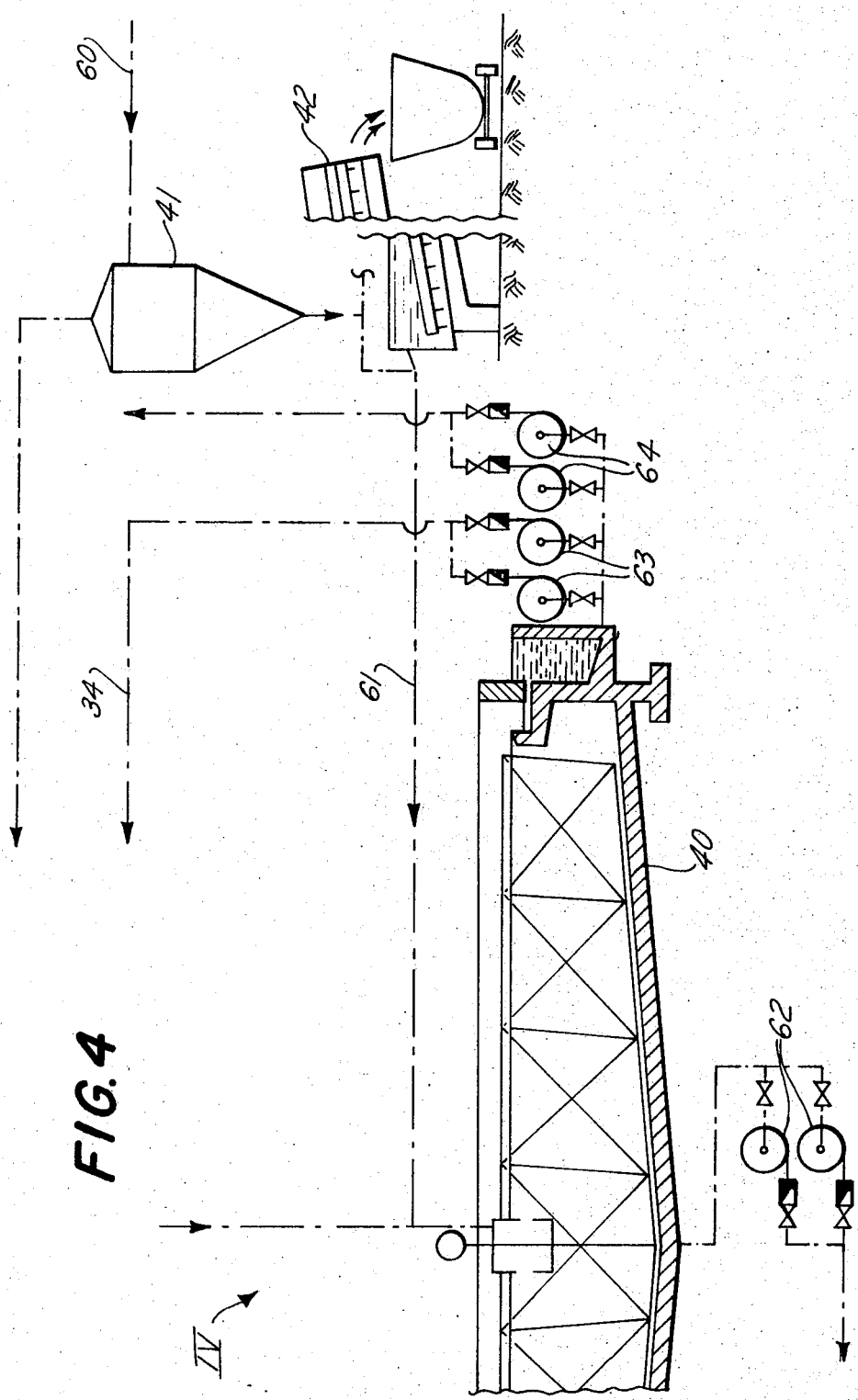

The effluent from scrubbing station III, collected in vessel 59, exists therefrom via a conduit 60 (see also FIG. 4) terminating at a hydrocyclone 41 in a regenerating station IV. The sludge precipitated in the cyclone is dried on a screen 72 from which the residual water is filtered out at 61 for delivery to a settling tank 40. The residual sludge collected in tank 40 is carried off by pumps 62 whereas solids retained by screen 42 can be removed by a bucket conveyor 63.

The supernatant liquid from tank 40 is recirculated by pump 64 via a conduit 34 to the spray heads 44 of station II and by pumps 65 via conduit 57 to the spray heads 37′ and 37″ of station III. Thus, during the charging of converter 1 the heavily dust-laden gases reaching cowl 26 are exhausted by blower 9 through duct 22 and main scrubbing station III, valve 23d being closed at that time. At other times, especially during refining, the converter 1 discharges its gases into the duct 2 for treatment in secondary station II while slide valve 23d is open and duct 22 is blocked by insert 37″; contaminated air present in the vicinity of the converter is then drawn off through station II by blower 15 via entry branches 24d and 24e of duct 24.

The circulation of the wash water through scrubbing stations II and III in tandem, coupled with the recovery of a large portion of the spent water in settling tank 40, ensures a particularly economic mode of operation of our system.

We claim:

1. A gas-purification system for a steel-making plant including a converter and ancillary equipment giving rise to dust-laden waste gases, comprising:
   a main scrubbing station provided with first irrigation means for gases to be purified;
   a secondary scrubbing station provided with second irrigation means for gases to be purified;
   first duct means connected to said main scrubbing station and positioned to receive waste gases from said converter during operation thereof;
   second duct means connected to said secondary scrubbing station and positioned to receive waste gases from said ancillary equipment;
   third duct means with an inlet positioned in the vicinity of the converter outlet for intercepting gases evolving during charging of the converter and directing the gases so intercepted to said main scrubbing station; and
   valve means for selectively connecting said third duct means to said secondary scrubbing station.

2. A system as defined in claim 1 wherein said first duct means comprises a substantially vertical pipe section above the converter, said inlet forming an annular cowl about said pipe section.

3. A system as defined in claim 1 wherein said second duct means is provided with a tubular nozzle downstream of said second irrigation means centered on a vertical axis, an insert in said nozzle defining therewith a constricted annular passage for irrigated particle-laden gases, and a separation chamber below said nozzle with an exit port above the level of the lower end of said nozzle for gases freed from at least some of their entrained particles.

4. A system as defined in claim 1 wherein said second duct means has a plurality of parallel entry branches juxtaposed with different pieces of said ancillary equipment, said entry branches being provided with shutter means for selectively opening and closing same.

5. A system as defined in claim 1 wherein said first and second irrigation means include a common source of wash water.

6. A system as defined in claim 5 wherein said source comprises a settling tank connected to receive the effluents of said main and secondary scrubbing stations.

7. A system as defined in claim 5 wherein said first irrigation means includes a plurality of washing stages in cascade in said first duct means, at least one of said stages being connected to said secondary scrubbing station for circulating the effluent thereof through said main scrubbing station.

8. A system as defined in claim 7 wherein said first irrigation means comprises a further washing stage in said third duct means and a water separator common to said first and third duct means downstream of all said washing stages.

9. A system as defined in claim 8 wherein said first and third duct means are each provided with a tubular nozzle between their respective washing stages and said water separator, further comprising an insert in said nozzle defining a constricted annular passage therewith, said insert being operable to block the flow through said passage.

10. A system as defined in claim 9 wherein at least the nozzle insert of said third duct means is provided with pressure-sensitive control means for blocking the associated annular passage in response to a relatively low pressure upstream of said nozzle insert, said ancillary scrubbing station being provided with exhaust means generating said relatively low pressure in said third duct means upon operation of said valve means to connect said third duct means to said ancillary scrubbing station.

* * * * *